June 24, 1924.

P. DE MATTIA 1,499,297

COLLAPSIBLE CORE FOR PNEUMATIC TIRES

Filed Aug. 6, 1921  2 Sheets-Sheet 1

WITNESSES

INVENTOR
PETER DE MATTIA
BY
ATTORNEYS

June 24, 1924.
P. DE MATTIA
1,499,297
COLLAPSIBLE CORE FOR PNEUMATIC TIRES
Filed Aug. 6, 1921 2 Sheets-Sheet 2
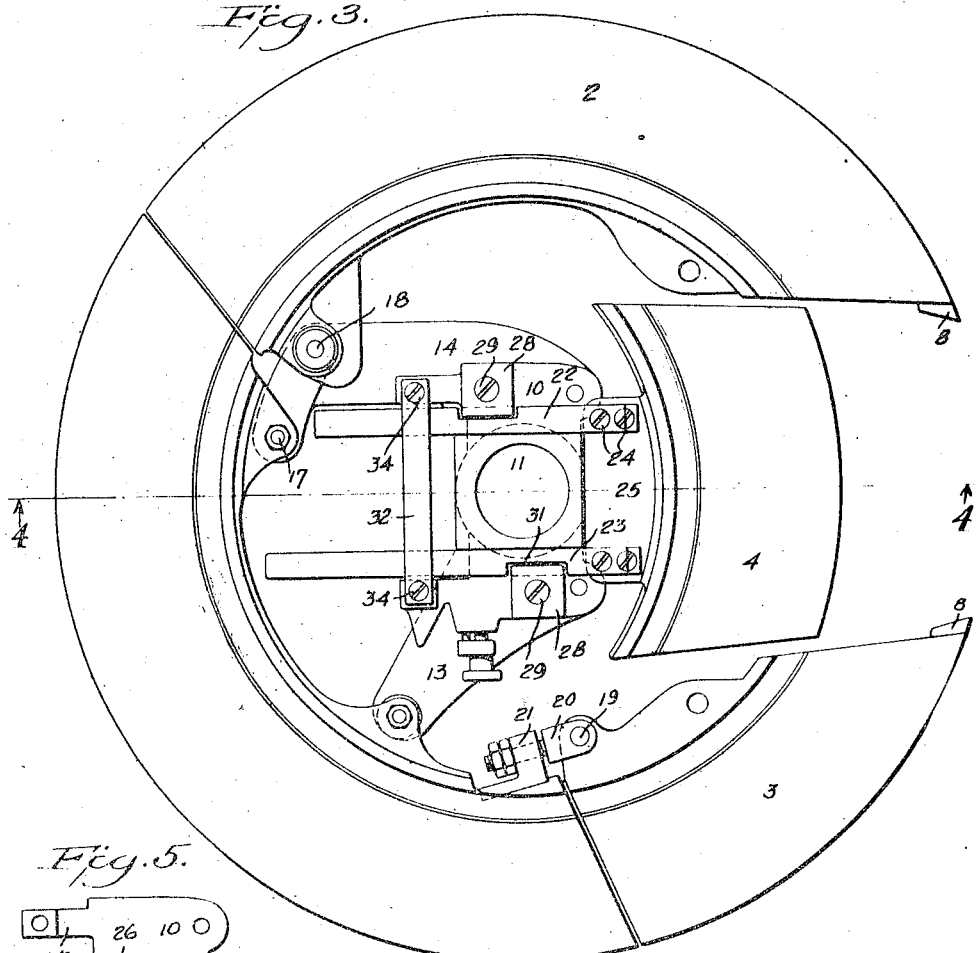
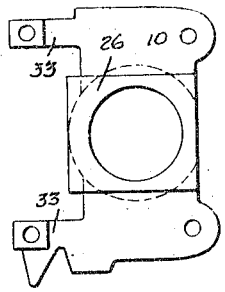
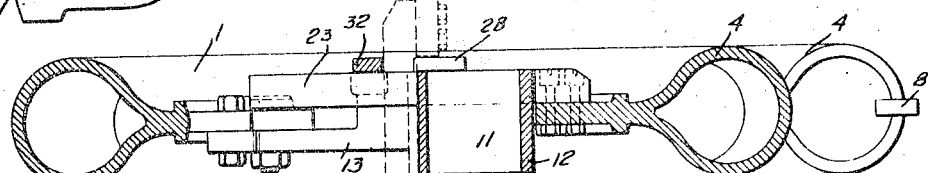
WITNESSES
INVENTOR
PETER DE MATTIA
BY
ATTORNEYS Patented June 24, 1924.

1,499,237

UNITED STATES PATENT OFFICE.

PETER DE MATTIA, OF CLIFTON, NEW JERSEY, ASSIGNOR TO DE MATTIA BROS., OF GARFIELD, NEW JERSEY, A CORPORATION OF NEW JERSEY.

COLLAPSIBLE CORE FOR PNEUMATIC TIRES.

Application filed August 6, 1921. Serial No. 490,301.

*To all whom it may concern:*

Be it known that I, PETER DE MATTIA, a citizen of the United States, and a resident of Clifton, in the county of Passaic and State of New Jersey, have invented certain new and useful Improvements in Collapsible Cores for Pneumatic Tires, of which the following is a full, clear, and exact description.

The present invention relates to collapsible cores used in the manufacture of pneumatic tires.

The object of the invention is to provide a collapsible core with a chuck having a relatively large central spindle opening whereby it may be mounted upon a relatively large spindle, and at the same time provide one of the segmental sections of the core with a sliding connection with the chuck so arranged as to span or straddle the central opening so as to be effectively supported and yet have a free movement radially in making and breaking the operative continuity of the core.

A further object of the invention is to provide means whereby this segmental core section when it shall have been retracted may be moved upwardly, thus disconnecting the sliding connection with the chuck and suspended on the chuck out of the path of movement of other core sections, and to so construct the sliding connection that while it may be readily broken to permit the upward movement of the sliding core section, there shall be no liability of an accidental disconnection.

Further objects of the invention will appear in connection with the following description thereof.

The invention is illustrated in the accompanying drawings, in which—

Figure 3 is a view similar to Figure 1 showing the segmental core section forming the key section retracted, preliminary to raising it to remove it from the plane of movement of adjacent core sections.

Figure 4 is a diametrical cross section taken on the line 4—4 in Figure 3 and showing in dotted lines the position of the key section when removed and suspended during the movement of adjacent core sections.

Figure 5 shows a plan view of the top plate of the chuck.

Similar reference characters will be employed throughout the specification and drawings to designate corresponding parts.

Figure 1:
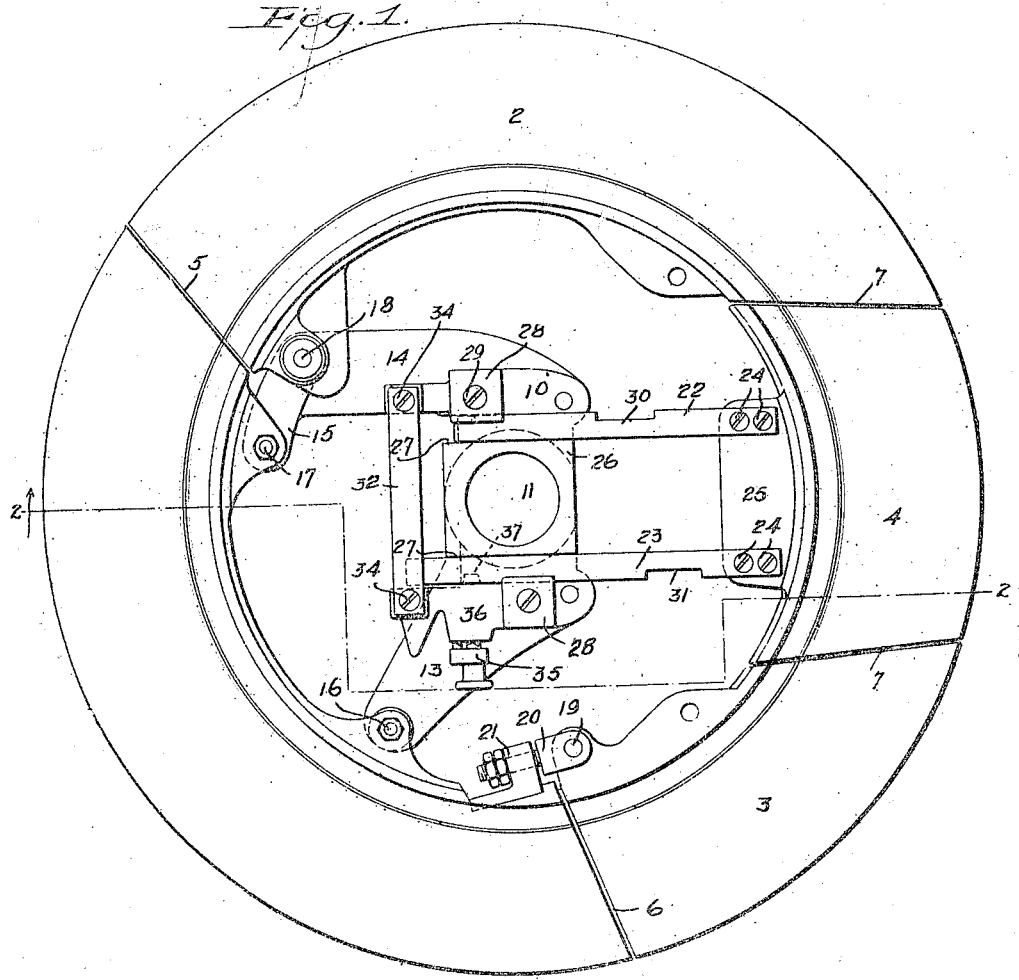
Figure 1 shows a plan view of a combined core and chuck embodying the invention, the core members being shown in operative continuity.
Figure 2:
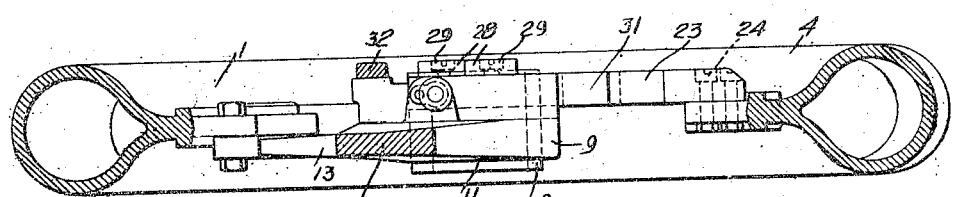
Figure 2 shows diametrical sections taken on the line 2—2 in Figure 1, parts being shown in elevation.

The apparatus comprises a core made up of segmental sections 1, 2, 3 and 4. The sections in cross-section correspond to the internal cross-sectional shape of a pneumatic tire formed thereon, the joints between the sections being preferably formed on tangential lines, as indicated at 5, 6 and 7. The joints 7 converge from the inner to the outer peripheries as shown in Figures 1 and 2 so that the segmental core section 4 may be freely moved in a radial direction inward and outward, as indicated in Figure 3 between the adjacent ends of the core sections 2 and 3, and acting somewhat in the nature of a wedge so that when the parts are in operative continuity, as shown in Figure 1, the wedge action of the key section 4 will assist in maintaining the operative continuity. Preferably the faces of the respective core sections will be provided with complementary engaging members such as the tenons 8 (see Figure 2) arranged to engage slots (not shown) in the opposed faces of adjacent core members.

These core sections are supported by a chuck which in the present form comprises a base plate 9 and a top plate 10. Each of these plates is provided with a relatively large circular opening 11 adapted to receive and to fit a relatively large spindle or support and so that the core and chuck may be rotated about the spindle in a manner well known to those skilled in this art. The chuck is provided with a circular bearing 12 and with arms 13 and 14. The arm 14 is provided with an integral extension 15. The segmental core section 1 is fixedly supported and connected to the arms 13 and the extension 15 of the arm 14 by bolts 16 and 17. The segmental core section 2 is pivotally supported at 18 upon the arm 14 so that the core section 2 may have an inward and outward swinging movement about the pivot 18 as a center. The core section 3 is pivoted at 19 to a swivel 20 which in turn is pivotally mounted in a bearing 21 carried by the fixed core section 1, the arrangement being such that the core section 3 not only has an inward and outward swinging movement about its pivot 19 but by the action of the swivel 20 it will have a downward and upward swinging movement with relation to the plane of the core sections when in operative continuity.

The segmental core section 4 which, as before suggested, constitutes the key section, is arranged to have a radial sliding movement into and out of operative continuity and for this purpose it is provided with the inwardly extending parallel bars 22 and 23. The bars are rigidly connected by means of the bolts 24 to a plate 25 comprising an integral part of the key section 4 from which they extend inwardly parallel to each other and in the same horizontal plane. The bars 22 and 23 are spaced apart a distance corresponding to the opposite parallel sides of a rectangular bearing 26 projecting upward from the plate 10 (see Figures 1, 2 and 5) and have a sliding close contact with the faces 27 of said rectangular bearing 26. Retaining plates 28 are secured by screws 29 to the plate 10 in position to overlap the upper surface of the bars 22 and 23 as shown clearly in Figures 1 and 3 of the drawings, whereby when the parts are assembled, the plates 28 assist in holding the bars 22 and 23 in position on the plate 10, and co-operating with the plate 10 and with the rectangular bearing 26, form guideways through which and into which the bars 22 and 23 may have a free sliding movement. The bars 22 and 23 are provided with notches 30 and 31 which, when brought beneath the overhanging plates 28, permit the bars 22 and 23 to be lifted out of the guideways and tipped up so that the bars 22 and 23 may be passed down between the chuck and a brace bar 32 supported upon the rearwardly extending arms 33 of the plate 10 and affixed thereto by means of screws 34.

It is to be noted that the plates 28 are not directly opposite each other and that therefore the notches 30 and 31 are correspondingly offset with relation to each other, the arrangement being such that when the bars are retracted as shown in Figure 3, the overlapping portion of the plates 28 will be brought in register with the notches 30 and 31. It will be further noted that one of the bars is longer than the other and that when advanced so as to place the key section 4 in operative continuity with the other sections, the longer bar 23 will have its rear end beneath the brace bar 32.

In operation the tire will be formed on the core when the parts are as shown in Figure 1. To remove the tire from the core the key section will be retracted to the position shown in Figure 3 and lifted up and dropped down as shown in dotted lines in Figure 4. Thereafter the section 3 may be removed from the tire and dropped, after which the section 2 may be removed from the tire by swinging it inward about its pivot 18, the tire then being stripped from the fixed section 1, all as is well known to those skilled in this art.

For the purpose of retaining the key section in its advanced position, a sliding bolt 35 is mounted in a bearing 36, carried by the chuck and its forward end engages a notch or socket 37, formed in the outer face of the bar 23.

I claim—

1. A chuck, a collapsible core supported by said chuck, said core comprising a radially movable key section, spaced parallel bars carried by said key section, spaced parallel slideways carried by the chuck, comprising overlapping plates off-set with relation to each other, and offset notches in the parallel bars arranged to be brought into register with the overlapping plates, whereby to permit the removal of the spaced bars from the slideways.

2. A chuck, a collapsible core supported by said chuck, said core comprising a radially movable key section, spaced parallel bars carried by said key section, spaced parallel slideways carried by the chuck, overlapping plates mounted on the chuck, and notches in the parallel bars arranged to be brought into register with the overlapping plates.

PETER DE MATTIA.